(12) United States Patent
Ioka et al.

(10) Patent No.: US 6,843,610 B2
(45) Date of Patent: Jan. 18, 2005

(54) IMAGE RECORDING APPARATUS HAVING A LINE-TYPE RECORDING HEAD CAPABLE OF CORRECTING RECORDING POSITION ERRORS OVER TWO-DIMENSION

(75) Inventors: Ken Ioka, Hachioji (JP); Toshiyuki Ebihara, Hino (JP); Seiji Tatsuta, Hachioji (JP); Yasuhiro Komiya, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/393,498

(22) Filed: Mar. 20, 2003

(65) Prior Publication Data

US 2004/0022570 A1 Feb. 5, 2004

(30) Foreign Application Priority Data

Mar. 29, 2002 (JP) ........................................ 2002-097418

(51) Int. Cl.[7] .............................. B41J 11/44; B41J 3/42; G06F 15/00
(52) U.S. Cl. .............................. 400/76; 400/74; 358/1.9
(58) Field of Search ...................... 400/76, 74; 359/1.9; 347/43, 42, 19, 248; 355/29, 32

(56) References Cited

U.S. PATENT DOCUMENTS

| | | | | |
|---|---|---|---|---|
| 4,899,049 A | * | 2/1990 | Hishinuma | 250/586 |
| 5,469,267 A | * | 11/1995 | Wang | 358/3.21 |
| 5,546,165 A | * | 8/1996 | Rushing et al. | 399/78 |
| 5,565,995 A | * | 10/1996 | Yamada et al. | 358/3.02 |
| 5,751,311 A | * | 5/1998 | Drake | 347/43 |
| 5,854,882 A | * | 12/1998 | Wang | 358/1.9 |
| 6,026,216 A | * | 2/2000 | Ohtsuka et al. | 358/1.9 |
| 6,287,027 B1 | * | 9/2001 | Komiya et al. | 400/74 |
| 6,607,260 B1 | * | 8/2003 | Ikeda | 347/19 |
| 6,624,876 B2 | * | 9/2003 | Fukuda et al. | 355/29 |
| 2002/0048056 A1 | * | 4/2002 | Kubo | 358/518 |

FOREIGN PATENT DOCUMENTS

| | | |
|---|---|---|
| JP | 2002-079657 A | 3/2002 |
| JP | 2002-096462 A | 4/2002 |
| JP | 2002-144542 A | 5/2002 |
| JP | 2002-292859 A | 10/2002 |
| JP | 2002-307666 A | 10/2002 |

\* cited by examiner

*Primary Examiner*—Charles H. Nolan, Jr.
*Assistant Examiner*—Wasseem H. Hamdan
(74) *Attorney, Agent, or Firm*—Frishauf, Holtz, Goodman & Chick, P.C.

(57) ABSTRACT

An image recording apparatus is provided which records an image by scanning, relatively to a recording medium, a line-type recording head unit in a direction substantially perpendicular to a predetermined direction, wherein the line-type recording head unit includes a plurality of recording heads which are disposed in a direction substantially the same as the predetermined direction and which have recording width that partially overlap each other and wherein each of the recording heads has a plurality of recording elements disposed in a direction substantially the same as the predetermined direction. The image recording apparatus includes a correction data generator for producing correction data for correcting characteristics of respective recording elements at two-dimensional positions on the recording medium, and an adjustment unit for adjusting an input image signal inputted to the recording elements at the two-dimensional positions, based on the correction data.

15 Claims, 8 Drawing Sheets

IMAGE RECORDING APPARATUS HAVING A LINE-TYPE RECORDING HEAD CAPABLE OF CORRECTING RECORDING POSITION ERRORS OVER TWO-DIMENSION

This application claims the benefit of Japanese Application No. 2002-97418 filed in Japan on Mar. 29, 2002, the entire contents of which are incorporated herein by reference.

BACKGROUND OF THE INVENTION

1. Field of the Invention

The present invention relates to an image recording apparatus, and more particularly, to an image recording apparatus including a line-type recording head unit formed by connecting a plurality of recording heads and capable of performing high-speed recording.

2. Description of Related Art

An image correction apparatus for use in an image recording apparatus is disclosed in Japanese Unexamined Patent Application Publication No. 2000-168109 (U.S. Pat. No. 6,287,027). This image correction apparatus is intended to be applied to an image recording apparatus having a recording head unit formed by disposing, contiguously in a main scanning direction, a plurality of recording heads each having a plurality of nozzles. When an image is recorded by this image recording apparatus, the recording head unit is scanned in a direction (subscanning direction) perpendicular to the main scanning direction in which a recording medium is fed. In this image correction apparatus, correction charts for a correction of mounting position errors of the recording heads, a correction of a density variation, and a color correction, respectively, are printed and respective corrections are performed on the basis of the printed correction charts.

In the meantime, in order to improve the operation speed and maintainability in conventional image recording apparatuses, an image recording apparatus has been proposed which includes a line-type recording head unit having a plurality of recording heads separated from each other in a direction of the width of recording medium. A specific example of such an image recording apparatus is a line-head ink-jet printer. In this image recording apparatus, nozzles serving as recording elements are disposed, at a pitch corresponding to the resolution on the recording apparatus, on each of the recording heads. In this image recording apparatus, when an image is recorded (printed), the line-type head unit including the plurality of recording heads and the recording medium are relatively scanned in a predetermined scanning direction.

The image correction apparatus disclosed in Japanese Unexamined Patent Application Publication No. 2000-168109 cited above makes a correction of one-dimensional position errors of the recording heads in the direction (subscanning direction) in which recording elements of the recording heads are disposed and/or makes a correction of the recording density. However, Japanese Unexamined Patent Application Publication No. 2000-168109 does not disclose a technique of correcting two-dimensional recording position errors due to zigzag motion and/or vibrations in the feeding direction of a recording medium, a technique of correcting a density variation due to a change in paper feeding speed or due to a feeding speed variation or zigzag motion of a recording medium or due to head temperature, nor disclose a technique of correcting a change in an area in which overlapping of recording elements occurs between adjacent recording heads.

In the correction performed in the image recording apparatus using the line-type recording head unit having plural recording heads, it is required to make a correction of recording position errors over two-dimensional positions on a recording medium and/or make a correction of a two-dimensional density variation.

SUMMARY OF THE INVENTION

It is an object of the present invention to provide an image recording apparatus using a line-type recording head unit or the like that is capable of correcting recording position errors over two-dimensional positions on a recording medium and correcting a two-dimensional density variation.

In brief, the present invention provides an image recording apparatus for recording an image by scanning, relatively to a recording medium, a line-type recording head unit in a direction substantially perpendicular to a predetermined direction, wherein the line-type recording head unit includes a plurality of recording heads which are disposed in a direction substantially the same as the predetermined direction and which have recording widths that partially overlap each other, and wherein each of the recording heads has a plurality of recording elements disposed in a direction substantially the same as the predetermined direction, said image recording apparatus comprising: correction data generation means for producing correction data for correcting characteristics of relative recording elements at two-dimensional positions on the recording medium, and adjustment means for adjusting an input image signal supplied to the recording elements at the two-dimensional positions, based on the correction data.

The above and other objects, features and advantages of the invention will become more clearly understood from the following description referring to the accompanying drawings.

DETAILED DESCRIPTION OF PREFERRED EMBODIMENTS

Embodiments of the present invention are described below with reference to drawings.

Figure 1:
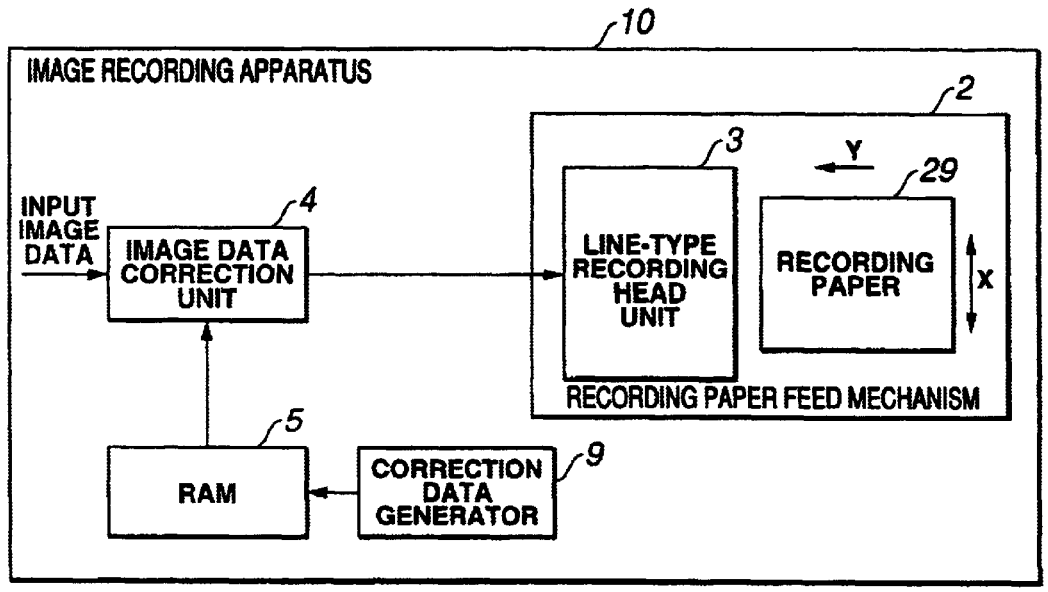
FIG. 1 is a block diagram showing a construction of an image recording apparatus according to a first embodiment of the present invention.

FIG. 1 is a block diagram showing a construction of an image recording apparatus according to a first embodiment of the present invention.

The image recording apparatus 10 according to the present embodiment is, for example, a line-head ink-jet printer having a line-type recording head unit fixed and supported so as to be capable of printing over a range corresponding to the width of recording paper, wherein an image is recorded (printed) on the recording paper by moving relatively to the line-type recording head unit, the recording paper in a paper feed direction (Y direction). In the following description, the paper feed direction is referred to as a Y direction, and a direction perpendicular to the Y direction, that is, the direction of the width of recording paper, is referred to as an X direction.

The image recording apparatus 10 includes, as shown in FIG. 1, a recording paper feed mechanism 2 for feeding a recording paper 29 serving as a recording medium in the Y direction, a line-type recording head unit 3 fixed and disposed on an upper portion of the recording paper feed mechanism 2, an image data correction unit 4 serving as correction means (adjustment means for adjusting an input image signal) for correcting input image data, that is, an image signal to be recorded, on the basis of correction data, a correction data generator 9 serving as correction data generation means for producing correction data, and an RAM 5 serving as a memory for storing the correction data.

The recording paper feed mechanism 2 is a paper feed mechanism including a driving belt 2a (shown in FIG. 4) for feeding recording paper 29 in the Y direction.

Figure 3:
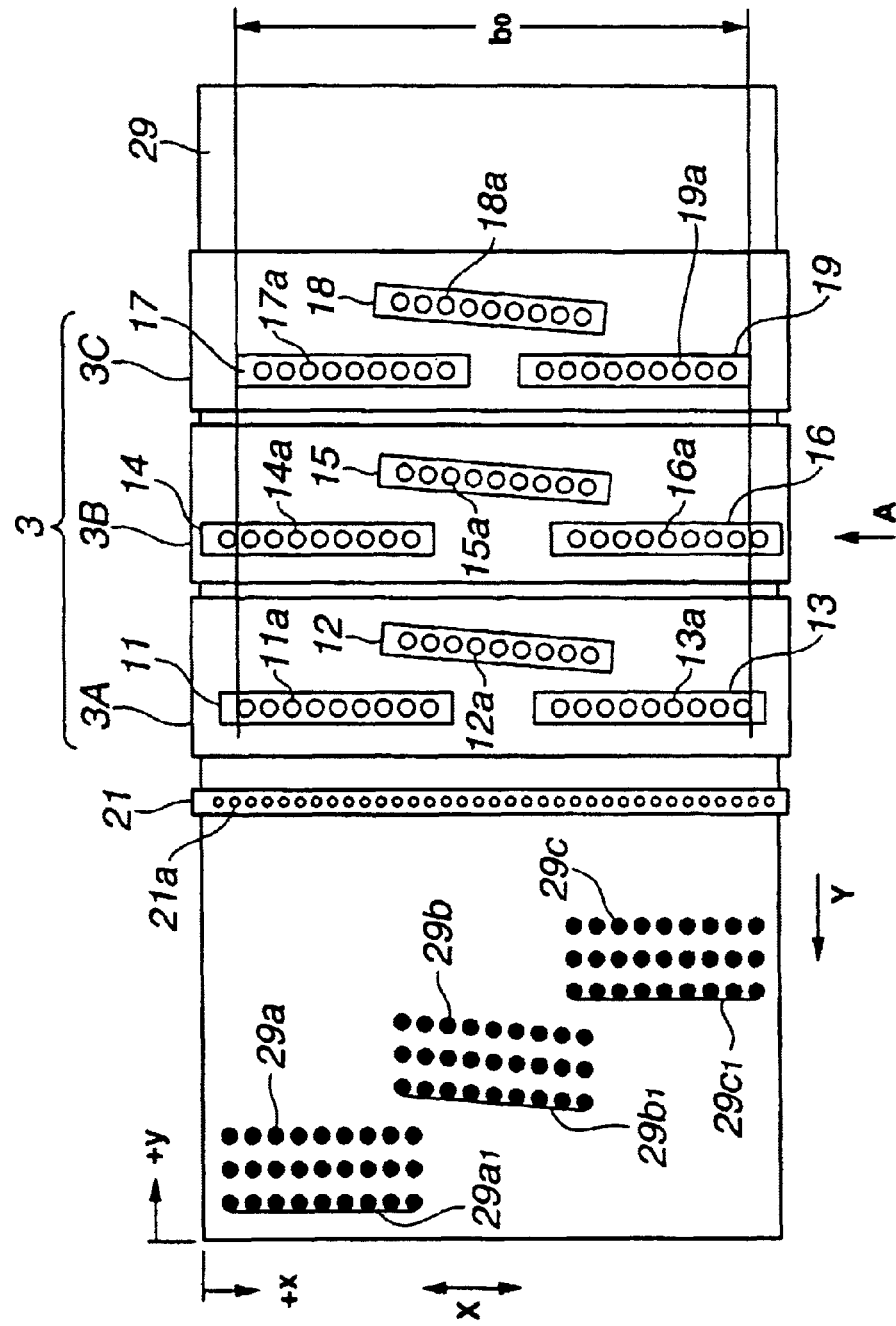
FIG. 3 is a plan view showing a positional arrangement of a line-type recording head unit, a CCD sensor, and recording paper, in the image recording apparatus shown in FIG. 2.

The line-type recording head unit 3 includes a plurality of recording heads for different colors, wherein each recording head includes nozzles each serving as a recording element disposed spaced apart from the recording paper 29 by a predetermined distance in a vertical direction. The recording heads 11, 12, and 13 are fixed and supported contiguously in the X direction, as shown in FIG. 3.

On the basis of information indicating image recording position errors and density information determined using a test pattern, the correction data generator 9 produces correction data for correcting input image data.

The correction data is used to correct an image recorded over two-dimensional positions on the recording paper 29. That is, printing positions of nozzles serving as recording elements of the recording heads, amounts of ink emitted from nozzles, and timings of emitting ink are corrected in accordance with the correction data.

More specifically, the correction data is data on the basis of which image recording position errors at two-dimensional positions on recording paper and/or a two-dimensional density variation are corrected. The image recording position errors include image recording position errors due to zigzag motion and/or vibrations of the belt 2a of the recording paper feed mechanism 2 and two-dimensional image recording position errors due to position errors of nozzles of recording heads such as nozzle position errors in an XY plane, vertical nozzle position errors, and/or tilts of nozzles. One method of correcting image recording position errors on the basis of the correction data is to shift image data supplied to the recording heads in accordance with the correction data. Another method is to change the timing of emitting ink from the nozzles of the recording heads.

The density variation can be caused by a change in size of ink droplets emitted from the nozzles, and the density variation includes a density variation over two-dimensional recording positions. The density variation is caused by a change of the recording head with time and also by other factors such as ambient temperature and/or ambient humidity. The correction data for correcting the variation in image recording density is correction data in accordance with which the gray level or the dot density of the image data is changed or correction data in accordance with which a parameter such as a voltage or a pulse width of a driving voltage waveform for controlling ink emission from the recording heads is changed thereby changing the size of ink droplets emitted from the nozzles.

In the image recording apparatus 10 constructed in the above-described manner according to the present embodiment, the correction data produced by the correction data generator 9 is first stored in the RAM 5. Input image data to be recorded is corrected by the image data correction unit 4 in accordance with the correction data read from the RAM 5, and the resultant corrected image data is outputted to the line-type recording head unit 29. In accordance with the corrected image data, the line-type recording head unit 29 emits ink from the recording head nozzles toward the recording paper 29 fed in the Y direction by the recording paper feed mechanism 2 thereby recording (printing) an image on the recording paper 29.

The above described correction data are produced differently depending on recording conditions in various recording modes such as plural values of the recording paper feeding speed, ambient conditions on temperature of a plurality of recording heads and environmental humidity, recording colors, types of recording paper, and/or schemes of converting image data into two-level or multi-level data. The produced correction data are stored in the RAM 5 and the input image data is corrected in accordance with the correction data stored in the RAM 5. In order to handle a change with time, the temperature of the recording heads, vibrations, shifts from predetermined positions, and/or recording density may be monitored at scheduled intervals, and the correction data may be rewritten.

The correction data stored in the RAM 5 is required to cover the entire area of recording paper in the XY plane. However, such correction data becomes huge in data size. One technique for avoiding the above problem is to compress the data size by means of principal-component analysis. Another technique is to store only correction data for predetermined positions or for predetermined conditions. In this case, the image data correction unit 4 may determine correction data for positions other than the predetermined positions or for conditions other than the predetermined conditions by means of calculation based on an interpolation technique.

In the image recording apparatus 10 according to the present embodiment, input image data is corrected depending on the two-dimensional positions in the XY plane of the recording paper 29 in accordance with the correction data, thereby ensuring that an image is recorded (printed) on the recording paper 29 without producing recording position errors or a density variation.

The image correction processing according to the present embodiment may also be applied to an image recording apparatus using a recording head unit of a type other than the ink-jet recording head unit, such as a thermal transfer recording head unit.

Now, an image recording apparatus according to a second embodiment of the present invention is described.

Figure 2:
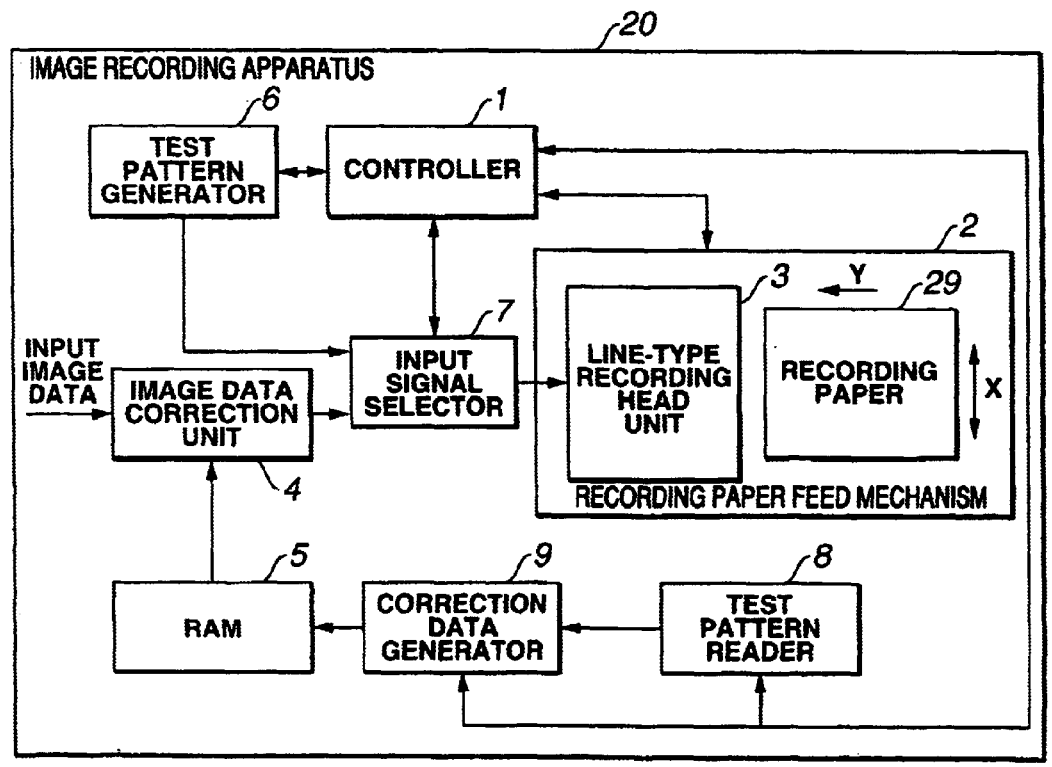
FIG. 2 is a block diagram showing a construction of an image recording apparatus according to a second embodiment of the present invention.
Figure 4:
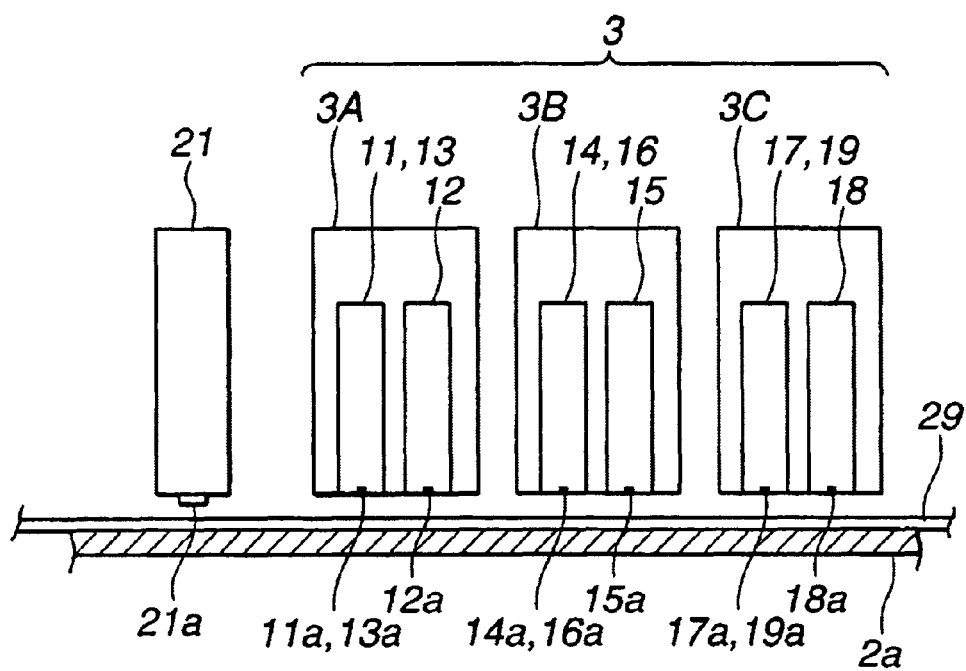
FIG. 4 is a view seen in a direction denoted by an arrow A in FIG. 3.
Figure 5:
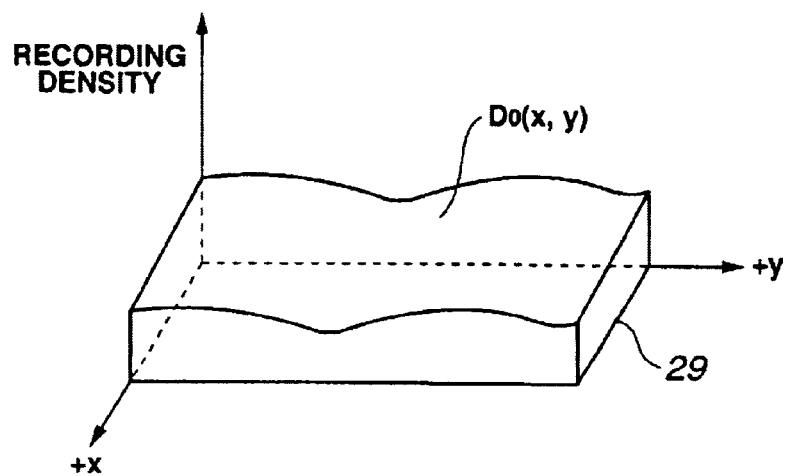
FIG. 5 is a diagram showing a variation in density of a test pattern recorded on recording paper by the image recording apparatus shown in FIG. 2 in accordance with uniform input image data, wherein an input-output characteristic (gamma characteristic) here is assumed to be linear.
Figure 6:
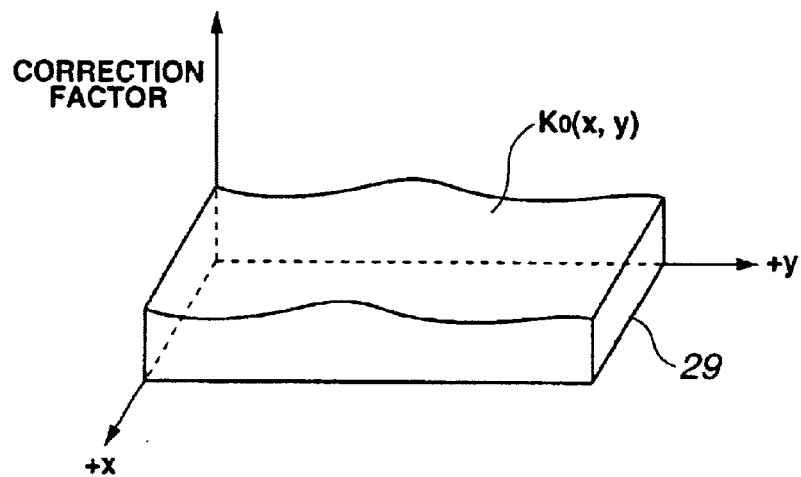
FIG. 6 is a diagram showing a correction factor (correction data) used by the image recording apparatus shown in FIG. 2 to correct the variation in the density of the recorded pattern shown in FIG. 5.
Figure 7:
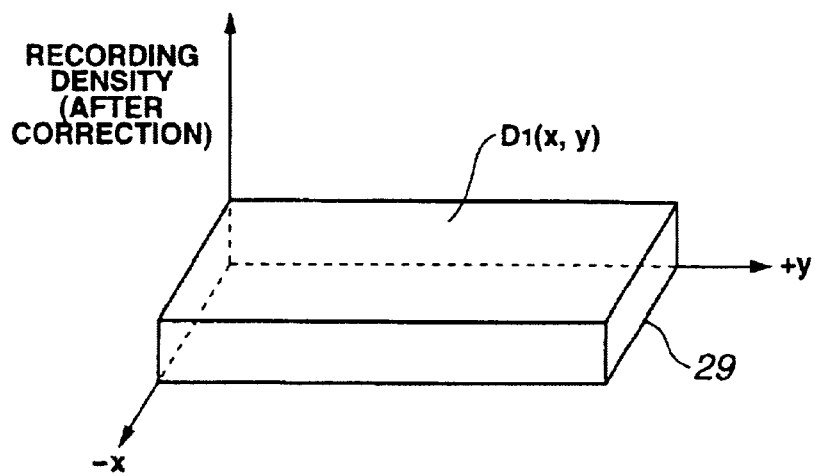
FIG. 7 is a diagram showing corrected recording density obtained, in the image recording apparatus shown in FIG. 2, by multiplying the uniform input image data by the correction factor shown in FIG. 6.

FIG. 2 is a block diagram showing a construction of the image recording apparatus according to the second embodiment. FIG. 3 is a plan view showing a positional arrangement of a line-type recording head unit, a CCD sensor, and recording paper, in the image recording apparatus according to the second embodiment, and FIG. 4 is a view seen in a direction denoted by an arrow A in FIG. 3. FIG. 5 is a diagram showing a variation in density of a test pattern recorded on recording paper by the image recording apparatus shown in accordance with uniform input image data. FIG. 6 is a diagram showing a correction factor (correction data) used to correct the variation in the density shown in FIG. 5. FIG. 7 is a diagram showing corrected recording density of the test pattern obtained by multiplying the uniform input image data by the correction factor shown in FIG. 6.

The image recording apparatus 20 according to the present embodiment is, for example, an ink-jet printer of the line head type having a line-type recording head unit fixed and supported so as to be capable of printing over a range corresponding to the width of recording paper, wherein an image is recorded (printed) on the recording paper by moving, relatively to the line-type recording head unit, the recording paper in a paper feed direction (Y direction), as with the image recording apparatus 10 according to the first embodiment described above.

The image recording apparatus 20 includes, as shown in FIG. 2, a controller 1 serving as control means including a CPU responsible for controlling the entire image recording apparatus 20, a recording paper feed mechanism 2 for feeding recording paper 29 serving as a recording medium in the Y direction, a line-type recording head unit 3 fixed and arranged on an upper portion of the recording paper feed mechanism 2, an image data correction unit 4 serving as correction means (image signal adjustment means) for correcting input image data (an image signal to be recorded) on the basis of correction data, a test pattern generator 6 serving as test pattern generation means for generating a test pattern under the control of the controller 1, an input signal selector 7 for selecting either the input image data output from the image data correction unit 4 or the test pattern image data output from the test pattern generator 6 and outputting the selected data to the line-type recording head unit 3, a test pattern reader 8 serving as test pattern reading means for reading a test pattern printed in accordance with the test pattern image data and also serving as recorded image reading means, a correction data generator 9 serving as correction data generation means for generating correction data, and an RAM 5 serving as a memory for storing the correction data.

The recording paper feed mechanism 2, the correction data generator 9, the RAM 5, and the image data correction unit 4 are similar to corresponding components used in the first embodiment.

The line-type recording head unit 3 includes three color heads: a C (Cyan) line-type recording head unit 3A, an M (Magenta) line-type recording head unit 3B, and a Y (Yellow) line-type recording head unit 3C. The line-type recording head units 3A, 3B, and 3C include a set of recording heads 11, 12, and 13, a set of recording heads 14, 15, and 16, and a set of recording heads 17, 18, and 19, respectively (FIGS. 3 and 4).

The recording heads 11, 12, and 13 include, as shown in FIGS. 3 and 4, nozzles 11a, 12a, and 13a, respectively, serving as recording elements for emitting C-ink droplets, wherein nozzles are disposed in the X direction on each recording head such that they are spaced apart from the recording paper 29 by a predetermined distance in the vertical direction. The main parts of the respective recording heads 11, 12, and 13 are fixed and supported continuously in the X direction. The nozzles 11a, 12a, and 13a are held in the X direction over a range covering the recording range b0 of the width of recording paper, wherein some nozzles are overlapped with each other in boundary zones between adjacent heads of the recording heads 11, 12, and 13.

Similarly, main parts of respective recording heads 14, 15, and 16 are fixed and supported continuously in the X direction. Nozzles 14a, 15a, and 16a, serving as recording elements for emitting M-ink droplets, are held in the X direction on the respective recording heads 14, 15, and 16, over the range covering the recording range b0 of the width of recording paper, wherein some nozzles are overlapped with each other between adjacent heads.

Similarly, main parts of respective recording heads 17, 18, and 19 are fixed and supported continuously in the X direction. Nozzles 17a, 18a, and 19a, serving as recording elements for emitting Y-ink droplets, are held in the X direction on the respective recording heads 17, 18, and 19, over the range covering the recording range b0 of the width of recording paper, wherein some nozzles are overlapped with each other between adjacent heads.

The test pattern reader 8 includes a linear CCD 21 extending in a direction of the recording width, wherein the linear CCD 21 is disposed at a downstream location immediately adjacent in the Y direction to the line-type recording head unit 3. The test pattern recorded over the recording width b0 is detected by photosensor elements 21a of the linear CCD 21 thereby acquiring test pattern data.

The controller 1 includes a control unit responsible for controlling the entire apparatus 20. The controller 1 also includes characteristic difference detection means for detecting a characteristic difference, such as a recording position error or a recording density variation, based on the recorded image of the test pattern read by the test pattern reader 8.

The correction data used herein is similar to that used in the first embodiment described above. That is, the correction data is data associated with two-dimensional positions on recording paper, and is used to correct the input image data so as to prevent image recording position errors due to zigzag motion and/or vibrations of the belt 2a of the recording paper feed mechanism 2, image recording position errors due to position errors of nozzles of recording heads such as nozzle position errors in the XY plane, vertical nozzle position errors, and/or tilts of nozzles, and further a density variation due to a variation in size of ink droplets.

The processing of producing correction data and the processing of recording an image performed by the image recording apparatus 20 constructed in the above-described manner according to the present embodiment are described below.

If the position of some of the recording heads 11, 12, and 13 of the line-type recording head unit 3 is shifted from its original position when the recording head is exchanged or due to effects of aging, ambient temperature, vibrations, and/or mechanical shocks or for some other reason, or if a change in the feeding characteristic of the recording paper feed mechanism 2 occurs, an inevitable result is a change in the shape of an image printed in accordance with input data and a partial change in the density level of the printed image. In the image recording apparatus 20 according to the present embodiment, if such a change in a recorded image is detected, correction of data is performed.

First, under the control of the controller 1, test pattern image data is output from the test pattern generator 6 and sent to the line-type recording head unit 3 via the input signal selector 7. In synchronization with feeding of recording paper 29, ink droplets are emitted from nozzles of the recording heads 11 to 19, thereby recording on the recording paper 29 the test patterns 2a, 29b, and 29c shown in FIG. 3 and also recording other six test patterns (not shown) by other recording heads 14, 15, 16, 17, 18, and 19.

For example, in a case in which there is a positional shift in the recording head 12, as in the example shown in FIG. 3, a similar shift occurs in the location of the recorded test pattern 29b.

Position information and density information of the test patterns 29a, 29b, and 29c are detected by the CCD 21 when the test patterns 29a, 29b, and 29c pass under the test pattern reader 8.

The test patterns 29a, 29b, and 29c are recorded on recording paper such that no overlapping occurs among the recorded test patterns, and position/density information associated with the recording heads 11 to 19 is detected. In the case in which it is necessary to detect position/density information for each of nozzles 11a to 19a of the recording heads 11 to 19, the test patterns are recorded such that dots are recorded by thinning out dot recording positions thereby creating spaces between adjacent dots. The test pattern position information is acquired by detecting boundary lines, such as leftmost edge line 29a1, 29b1 and 29c1, of the respective test patterns 29a, 29b, and 29c. The detected position information is represented by coordinate values in a +y direction (opposite to the Y direction) and coordinate values in a +x direction (parallel to the X direction) with respect to an origin defined at the upper left corner of the recording paper 29.

From the position/density information associated with the test patterns 29a, 29b, and 29c, the controller 1 calculates position error information indicating shifts in recording positions from predetermined recording positions and information (recording density information) indicating a difference in density from a predetermined density. The resultant position error information and/or the recording density information are input to the correction data generator 9. On the basis of the position error information and/or the recording density information, the correction data generator 9 produces correction data, such as position error correction data or density correction factors, for correcting input image data.

For example, in a case in which the recording head 12 has a position error which causes the recording position error in the +y direction to increase with x coordinate value, as shown in FIG. 3, shifts in the +y direction of the respective nozzles of the recording head 12 are detected from the test pattern 29b, and correction data for delaying the timing of emitting ink droplets from the respective nozzles by amounts corresponding to the detected shifts in the +y direction is produced. On the other hand, in a case in which position shifts in the x direction are detected for the nozzles of the recording head 12 from the test pattern, correction data for shifting an image signal in the x direction by amounts corresponding to the detected position shifts of the nozzles is produced.

The recording position errors such as those described above occur not only due to positional shifts, in the XY plane, of the nozzles of the recording heads but also due to vertical shifts of nozzles or changes in inclination of recording heads or due to a change in the feeding speed of the recording paper 29, because vertical shifts of nozzles, changes in inclination of recording heads, and a change in recording paper position can result in changes in ink arrival positions on recording paper 29.

The variation in density of the test pattern is discussed below. In a case in which the input-output density characteristic (gamma characteristic) is linear, the variation in density is corrected using a correction factor as described below. For example, in a case in which a recording density distribution D0(x, y) over recording paper (in an xy plane) is detected from a test pattern as shown in FIG. 5, a correction factor k0(x, y) serving as correction data for correcting the recording density, produced by the correction data generator 9, is as shown in FIG. 6, and data indicating the correction factor k0(x, y) is stored in the RAN 5. The correction factor k0(x, y) may be correction data for correcting the input image data at position (x, y) or may be correction data for correcting the waveform of the driving voltage pulse (pulse voltage, pulse width, or the like) which causes ink droplets to be emitted from nozzles of recording heads.

In the case in which the input image data is corrected by the image data correction unit 4, corrected image data is obtained by multiplying the original image data by the correction factor k0(x, y). When input image data with a constant density level is given, if the input image data is corrected by multiplying the original input image data by the correction factor k0(x, y), the density distribution D1(x, y) of an image recorded on recording paper 29 in accordance with the corrected image data becomes constant as shown in FIG. 7.

In areas in which nozzles overlap with each other at edges in the X direction between adjacent recording heads, the amounts of ink emitted from those nozzles are adjusted so that correct density is obtained. However, if a shift in nozzle position occurs in those areas, the recording density changes. Therefore, the adjustment of recording density should be performed taking into account a change in density due to such a shift in nozzle position.

In the case in which the input-output density characteristic (gamma characteristic) is nonlinear, the variation in density detected from the test pattern is corrected using a correction factor in a manner described below.

Figure 8:
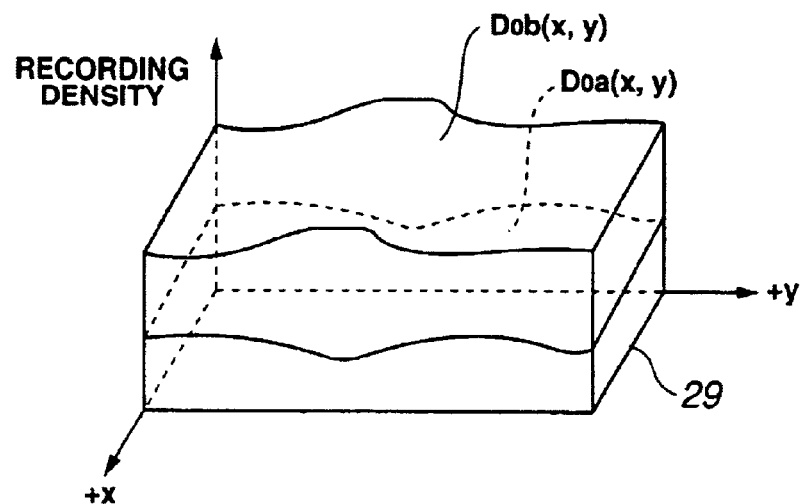
FIG. 8 is a diagram showing a variation in density of a test pattern recorded on recording paper by the image recording apparatus shown in FIG. 2 in accordance with uniform input image data, wherein a nonlinear input-output characteristic (gamma characteristic) is assured.
Figure 9:
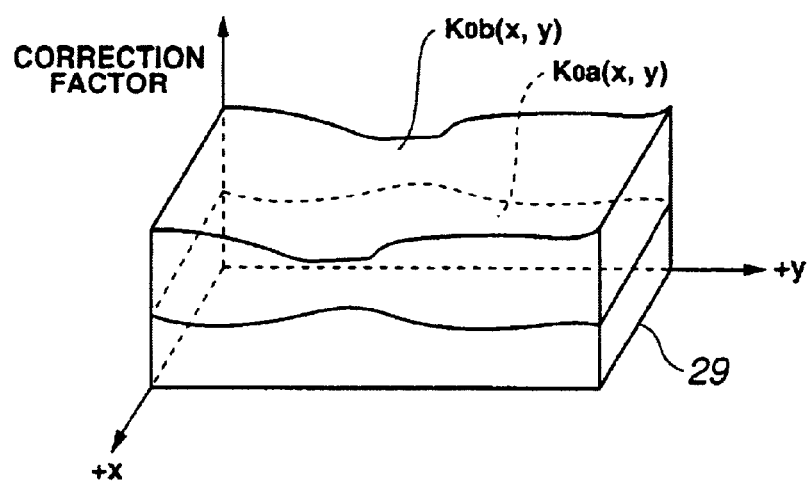
FIG. 9 is a diagram showing a correction factor (correction data) used by the image recording apparatus shown in FIG. 2 to correct the variation in the density of the recorded pattern shown in FIG. 8.

FIG. 8 shows density distributions D0a(x, y) and D0b(x, y) of test patterns recorded for two input image data having constant but different density levels, respectively, wherein the input-output density characteristic (gamma characteristic) is nonlinear. FIG. 9 shows correction factors k0a(x, y) and k0b(x, y) used as correction data for correcting the density distributions D0a(x, y) and D0b(x, y), respectively, of the recorded test patterns shown in FIG. 8. The correction factor data is calculated by the correction data generator 9.

Figure 10:
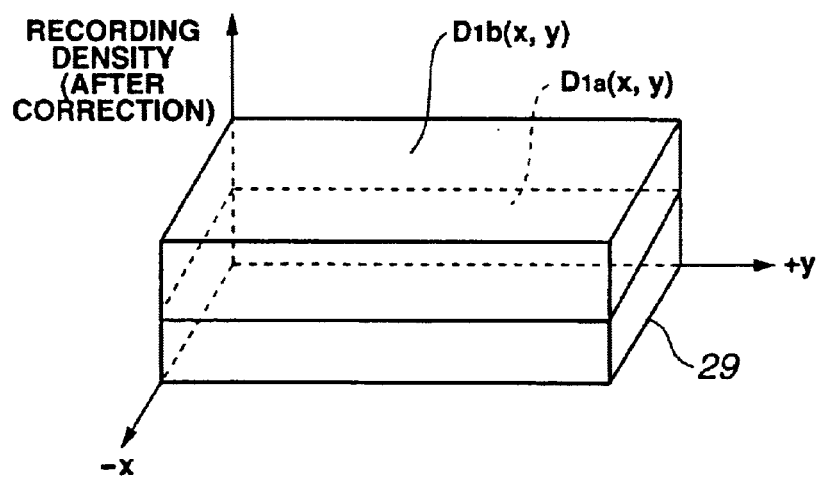
FIG. 10 is a diagram showing corrected recording density obtained, in the image recording apparatus shown in FIG. 2, by multiplying the uniform input image data by the correction factor shown in FIG. 9.

In the case in which the input image data is corrected by the image data correction unit 4, corrected image data is obtained by multiplying the original image data by the correction factor k0a(x, y) or k0b(x, y) for two different density levels. When original input image data with a constant density level is given, if an image is recorded on recording paper 29 in accordance with corrected image data obtained by multiplying the original input image data by the correction factor k0a(x, y) or k0b(x, y) for two different density levels, the resultant density distribution D1a(x, y) or D1b(x, y) of the recorded image becomes constant as shown in FIG. 10.

When recording of an image on the recording paper 29 is started, correction data is read with respect to input image data and the input image data is corrected in accordance with the correction data. The corrected input image data is outputted as ink emission data to the line-type recording head unit 3 via the input signal selector 7. The recording paper 29 is fed in the Y direction by the recording paper feed mechanism 2, and ink droplets are emitted by the line-type recording head unit 3 in synchronization with feeding of the recording paper 29 thereby correctly recording (printing) the image.

In the image recording apparatus 20 according to the present embodiment, a two-dimensional test pattern actually recorded is read, and correction data is automatically produced on the basis of pattern data obtained by reading the test pattern. This makes it possible to record a correct image having no recording position errors and having no density variation even when there is a feeding error of the recording paper feed mechanism, positions errors of recording heads, and/or a variation in density.

Although in the second embodiment described above, the line-type recording head unit 3 includes three color line-type recording head units, the line-type recording head unit 3 may further include a line-type recording head unit for a different color or a different density.

Now, an image recording apparatus according to a third embodiment of the present invention is described.

Figure 11:
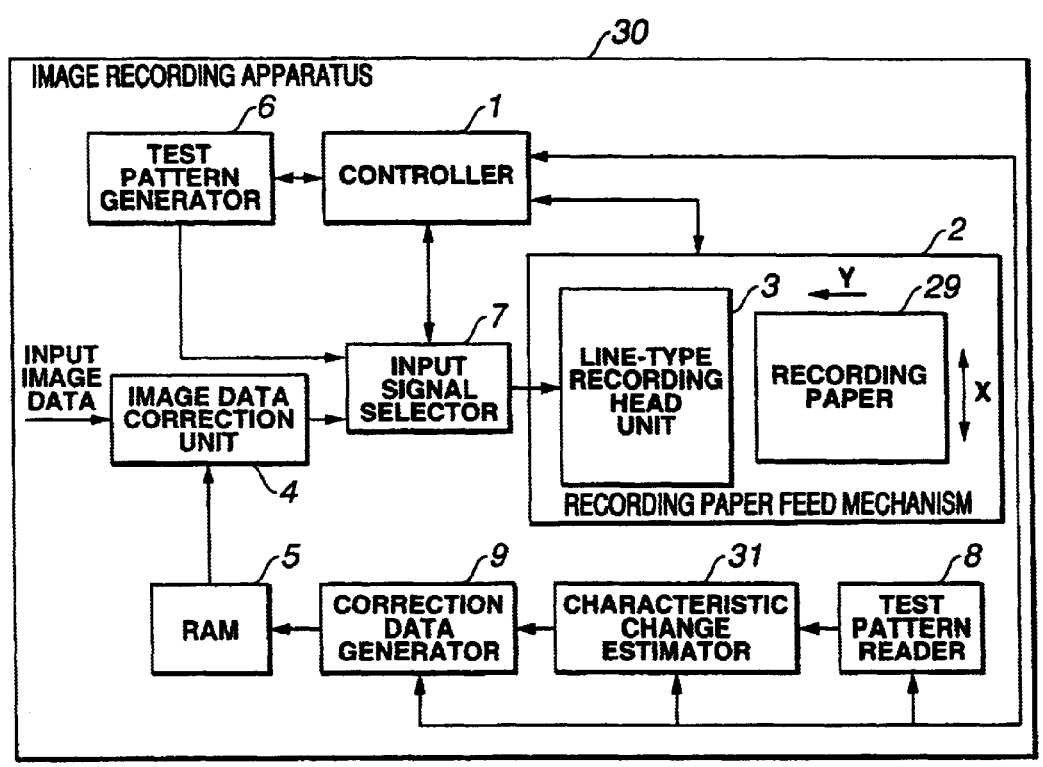
FIG. 11 is a block diagram showing a construction of an image recording apparatus according to a third embodiment of the present invention.

FIG. 11 is a block diagram showing a construction of an image recording apparatus according to the third embodiment.

The image recording apparatus 30 according to the present embodiment is, for example, an ink-jet printer of the line head type having a line-type recording head unit fixed and supported at a position so as to be capable of printing over a range corresponding to the width of recording paper, wherein an image is recorded (printed) on the recording paper by moving, relatively to the line-type recording head unit, the recording paper in a paper feed direction (Y direction), as with the image recording apparatus 10 or 20 according to the first or second embodiment described above. The image recording apparatus 30 is similar to the image recording apparatus 20 according to the second embodiment except that the image recording apparatus 30 additionally includes a characteristic change estimator 31. In FIG. 11, similar parts to those of the image recording apparatus 20 according to the second embodiment described earlier with reference to FIG. 2 are denoted by similar reference numerals. In the following description, only differences from the image recording apparatus 20 are explained.

In the image recording apparatus 30, a test pattern is recorded (printed) each time one page is printed (recorded). The test pattern is recorded in a margin area (non-recording area) at a leading edge of recording paper 29. From image data of the test pattern recorded in the margin area, the character change estimator 31 calculates, in real time, estimation information indicating estimated changes in characteristic of the recording head and characteristic of feeding recording paper. Subsequently, the correction data generator 9 produces correction data on the basis of the estimation information and stores the resultant correction data into the RAM 5 in real time. Thereafter, an actual image is recorded in a normal recording area of recording paper 29 in accordance with input image data corrected using the correction data in real time.

Estimation information, indicating a change in characteristic of the recording head and a change in state in which recording paper is fed, is calculated by the characteristic change estimator 31 as follows. The characteristics of the recording heads dealt with herein are characteristics of the recording heads at two-dimensional positions on recording paper, as in the second embodiment described earlier, which cause image recording position errors due to position errors of nozzles of recording heads such as nozzle position errors in the XY plane, vertical nozzle position errors, and/or tilts of nozzles, and a density variation due to a variation in amount of ink emitted from nozzles. Those characteristics of the recording heads have no relationships with the characteristic of feeding recording paper, and thus it is possible to estimate in real time the characteristics of the recording heads by reading the test pattern recorded in a narrow area in the margin area at a leading edge of recording paper.

On the other hand, image recording position errors may occur if the recording paper 29 is fed in an oblique direction or fed in a zigzag form depending on the state in which the belt 2a of the recording paper feed mechanism 2 is moved. Here, estimation information, indicating a characteristic variation in the state in which the recording paper is fed, is used to correct the recording position errors mentioned as above. Ideally, correction data for correcting the recording position errors due to a change in the characteristic of feeding recording paper is produced by evaluating a test pattern recorded over the entire recording area of recording paper. However, in practice, the state in which the belt 2a is moved is determined by a predetermined characteristic of the recording paper feed mechanism 2. Therefore, if a change in a paper feeding state is estimated from the test pattern recorded in the margin area, at the leading edge, of the recording paper, it is possible to estimate recording position errors which will occur in actual recording (not in printing of the test pattern but in printing of an actual image) in the estimated state in which recording paper is fed.

For example, if it is detected that the test pattern recorded in the margin area at the leading edge of recording paper is linearly slanted with respect to the Y direction, it is determined that the recording paper 29 is being fed in the detected slanted direction, and correction data for correcting errors due to the feeding in the slanted direction is produced, and, in actual recording, input image data is corrected in real time in accordance with the correction data.

On the other hand, in a case in which it is detected that the test pattern recorded in the margin area at the leading edge of the recording paper is curved with respect to the Y direction, it is determined that the recording paper 29 is being fed in a zigzag form. In this case, correction data for correcting errors due to the zigzag feeding is produced, and, in actual recording, input image data is corrected in real time in accordance with the correction data.

Figure 13:
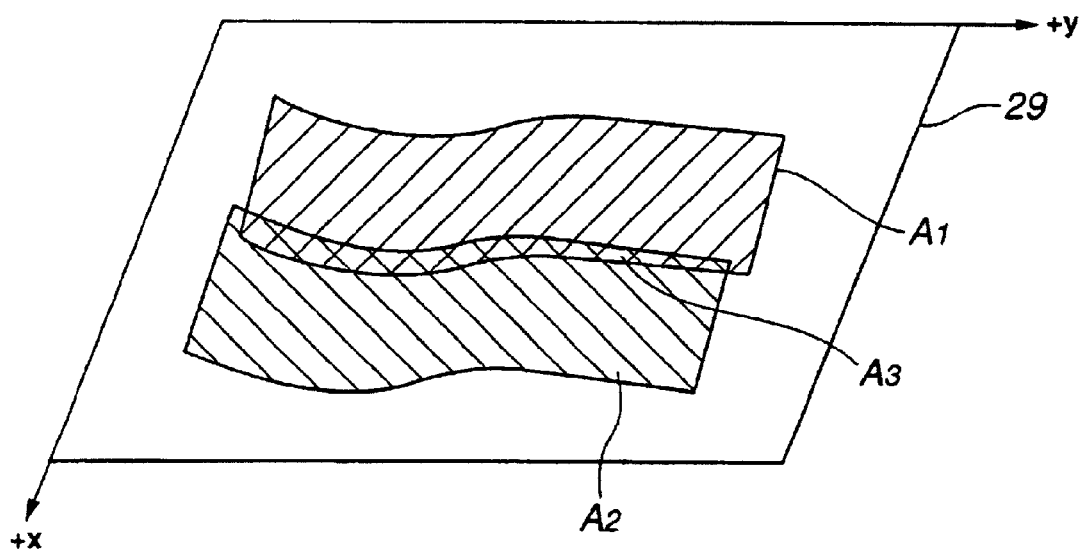
FIG. 13 is a diagram showing changes in patterns printed by two recording heads, adjacently disposed in an X direction, of the image recording apparatus shown in FIG. 3, wherein the changes in pattern occur due to zigzag motion of recording paper.

If the recording paper 29 is fed in a zigzag form, the zigzag feeding, patterns A1 and A2 by two recording heads adjacently located in the X direction change as shown in FIG. 13. Some nozzles overlap with each other in the X direction between the adjacent reading heads as described earlier, and the width of a pattern A3 printed by overlapping nozzles changes as shown in FIG. 13. As described above, also in the case in which the recording paper 29 is fed in a zigzag form, input image data used in actual printing can be corrected in accordance with correction data calculated on the basis of zigzag motion estimated from a part, printed in the margin area at the leading edge of recording paper, of the overlapping pattern A3.

Figure 12:
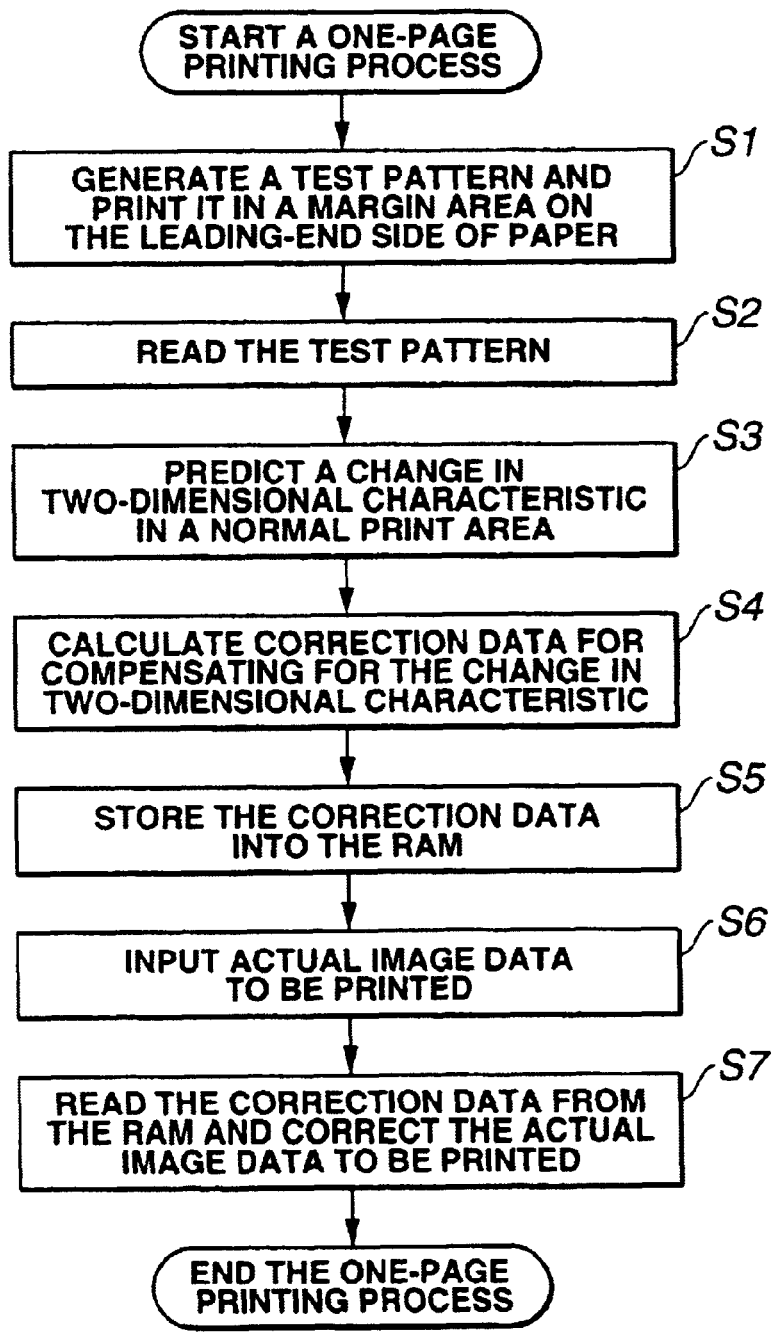
FIG. 12 is a flow chart showing a process of recording (printing) one page performed by the image recording apparatus shown in FIG. 11.

A process of recording (printing) one page of image performed by the image recording apparatus 30 according to the present embodiment is described below with reference to a flow chart shown in FIG. 12.

This processing is performed under the control of the controller 1. First, in step S1, the test pattern generator 6 generates test pattern data to be printed in the margin area. The recording paper feed mechanism 2 is then driven and the test pattern is printed in the margin area at the leading edge of recording paper 29. In step S2, the test pattern reader 8 reads the test pattern.

In step S3, from the read test pattern, the characteristic change estimator 31 calculates an estimated two-dimensional characteristic change over a normal recording area of recording paper.

In step S4, the correction data generator 9 produces correction data for correcting the two-dimensional characteristic change. In step S5, the correction data is stored in the RAM 5.

In step S6, input image data to be used in actual printing is input to the image data correction unit 4. In step S7, the image data correction unit 4 reads the correction data from the RAM 5 and corrects the input image data in accordance with the correction data. The corrected input image data is supplied to the line-type recording head unit 3 via the input signal selector 7, and one page of image is printed in the normal printing area.

In the above processing, the correction data for correcting the estimated two-dimensional characteristic change is calculated when the printing of the actual image is started, and the following printing processing is performed while performing the correction in real time.

In the image recording apparatus 30 according to the present embodiment, as described above, a two-dimensional characteristic change is read and estimated from a test pattern printed in a margin area of a recording paper, and correction data is produced in real time. In actual printing, a corrected image is printed without having to print a test pattern over the entire printing area.

Having described the preferred embodiments of the invention referring to the accompanying drawings, it should be understood that the present invention is not limited to the precise embodiments described and shown, and that various changes and modifications can be made by one skilled in the art without departing from the spirit or scope of the invention as defined in the appended claims.

What is claimed is:

1. An image recording apparatus for recording an image by scanning, relatively to a recording medium, at least one line-type recording head unit in a direction substantially perpendicular to a predetermined direction, wherein the line-type recording head unit includes a plurality of recording heads which are disposed in a direction substantially the same as the predetermined direction and which have recording widths that partially overlap each other, and wherein each of the recording heads has a plurality of recording elements disposed in a direction substantially the same as the predetermined direction, said image recording apparatus comprising:

correction data generation means for producing correction data for correcting characteristics of respective recording elements at two-dimensional positions on the recording medium, and adjustment means for adjusting an input image signal inputted to the recording elements at the two-dimensional positions, based on the correction data.

2. The image recording apparatus according to claim 1, further comprising:

test pattern generation means for producing a test pattern for detecting characteristics of the recording elements at the two-dimensional positions on the recording medium;

test pattern reading means for reading a test pattern recorded on the recording medium by the line-type recording head unit; and characteristic difference detection means for detecting differences in characteristic of the recording elements at the two-dimensional positions, from the read test pattern image, wherein based on the characteristic differences detected by the characteristic difference detection means, the correction data generation means generates the correction data for correcting the characteristics of the recording elements at two-dimensional positions.

3. The image recording apparatus according to claim 1, wherein a plurality of the line-type recording head units are disposed in the direction perpendicular to the predetermined direction so that an image is recorded by the plurality of line-type recording head units using inks having different colors or different densities.

4. The image recording apparatus according to claim 1, wherein the characteristics of the recording elements are recording densities at the two-dimensional positions on the recording medium.

5. The image recording apparatus according to claim 1, wherein the characteristics of the recording elements are input-output density characteristics of the recording elements at the two-dimensional positions on the recording medium.

6. The image recording apparatus according to claim 1, wherein the characteristics of the recording elements are two-dimensional positions on the recording medium where dots are recorded by the recording elements.

7. The image recording apparatus according to claim 1, wherein the adjustment means adjusts input image data supplied to the recording elements at the two-dimensional positions, in accordance with the correction data.

8. The image recording apparatus according to claim 1, wherein the adjustment means adjusts a driving voltage waveform applied to the recording elements at the two-dimensional positions, in accordance with the correction data.

9. The image recording apparatus according to claim 1, wherein the correction data generation means produces plural types of correction data depending on a recording condition under which recording on the recording medium is performed by the recording heads.

10. The image recording apparatus according to claim 9, wherein:
the recording condition is a relative speed between the recording heads and the recording medium; and
the plural types of correction data correspond to plural values of the relative speed employed by the image recording apparatus.

11. The image recording apparatus according to claim 9, wherein:
the recording condition comprises at least an ambient temperature or humidity of the recording heads; and
the plural types of correction data correspond to plural possible values of at least the ambient temperature and humidity in the image recording apparatus.

12. The image recording apparatus according to claim 1, further comprising recorded image reading means for reading an image recorded on the recording medium by the line-type recording head unit, wherein, based on the image data read by the recorded image reading means, the correction data generation means estimates a change in a factor associated with the characteristics to be corrected, and the correction data generation means generates the correction data taking into account the estimated change in the factor.

13. The image recording apparatus according to claim 12, wherein the change in factor associated with the characteristics to be corrected is a change in recording density over the two-dimensional positions on the recording medium.

14. The image recording apparatus according to claim 12, wherein the change in factor associated with the characteristics to be corrected is a change in input-output density characteristic of the recording elements over the two-dimensional positions on the recording medium.

15. The image recording apparatus according to claim 12, wherein the change in factor associated with the characteristics to be corrected is a change in recording position on the recording medium where a dot is recorded by each of the recording elements.

* * * * *